United States Patent [19]
Hutchison et al.

[11] Patent Number: 5,838,989
[45] Date of Patent: Nov. 17, 1998

[54] COMMON INTERFACE FOR A NETWORK HAVING DIFFERENT COMMUNICATION MEDIA EMPLOYING A CARRIER SENSE MULTIPLE ACCESS WITH COLLISION DETECTION (CSMA/CD) PROTOCOL

[75] Inventors: Jerry D. Hutchison, Littleton; Henry S. Yang, Andover, both of Mass.; William C. Mallard, Jr., Nashua, N.H.

[73] Assignee: Cabletron Systems, Inc., Rochester, N.H.

[21] Appl. No.: 560,173

[22] Filed: Nov. 17, 1995

Related U.S. Application Data

[63] Continuation of Ser. No. 907,951, Jul. 2, 1992, abandoned.
[51] Int. Cl.$^6$ ................................................. G06F 13/00
[52] U.S. Cl. ..................... 395/831; 395/834; 395/883; 395/309; 395/200.8; 370/445; 370/465
[58] Field of Search ................................. 395/800, 309, 395/831, 834, 883, 651, 200.8; 370/13, 910, 445, 465

[56] References Cited

U.S. PATENT DOCUMENTS

| | | | |
|---|---|---|---|
| 5,121,382 | 6/1992 | Yang et al. | 370/31 |
| 5,170,482 | 12/1992 | Shu et al. | 395/800 |
| 5,249,183 | 9/1993 | Wong et al. | 370/85.3 |
| 5,257,287 | 10/1993 | Blumenthal et al. | 375/19 |
| 5,264,958 | 11/1993 | Johnson | 395/309 |
| 5,265,124 | 11/1993 | Staab et al. | 375/3 |
| 5,299,195 | 3/1994 | Shah | 370/85.6 |
| 5,305,317 | 4/1994 | Szczepanek | 370/257 |
| 5,327,465 | 7/1994 | Winch et al. | 375/104 |
| 5,410,535 | 4/1995 | Yang et al. | 370/13 |

FOREIGN PATENT DOCUMENTS

| | | | |
|---|---|---|---|
| 8300413 | 2/1983 | WIPO | H04L 25/02 |

OTHER PUBLICATIONS

Level One, LXT901 Universal Ethernet Interface Adapter (Internal MAU) with Integrated 10Base T MAU, EnDec, AUI and Filters, Preliminary Information, May, 1992.

IEEE, Draft Supplement to ANSI/IEEE Std. 802.3–1990, 15. Fiber Optic Medium And Common Elements of Medium Attachment Units And Star, Type 10BASE–F, Dec. 16, 1991.

IEEE, Technical Committee on Computer Communications, 802.3 Supplements, Local and Metropolitan Area Networks, Dec. 31, 1990.

D. Wong, "Second Generation IOBASE T. Silicon Solutions"; Wescon Conference Record, vol. 35, Nov. 1991, North Hollywood US pp. 238–242.

E. Desouza, "Emerging Architectures for 10Base T Environments"; Wescon Conference Record, vol. 35, Nov. 1991, North Hollywood US, pp. 222–228.

*Primary Examiner*—Larry D. Donaghue
*Assistant Examiner*—John Follansbee
*Attorney, Agent, or Firm*—Wolf, Greenfield & Sacks, P.C.

[57] ABSTRACT

A switchable interface for conveniently coupling a network station of the CSMA/CD type to a network having any of a variety of communication media. The invention provides a single interface connector through which connection may be made directly to a twisted-pair medium, using the 10BASE-T protocol, or to a medium of a different type, through an AUI protocol and an appropriate media attachment unit. The interface connector has pin assignments chosen to minimize adverse effects of misconfiguring the station by connecting to a network having a protocol that is different from the one selected in the switchable interface. In one form of the invention, the switchable interface has the ability to determine the protocol being used by the network to which it is connected, and to switch the interface accordingly. Use of the common interface reduces station equipment cost and provides for increased user convenience, since only a single connector is needed to connect to a variety of media types.

11 Claims, 8 Drawing Sheets

COMMON INTERFACE FOR A NETWORK HAVING DIFFERENT COMMUNICATION MEDIA EMPLOYING A CARRIER SENSE MULTIPLE ACCESS WITH COLLISION DETECTION (CSMA/CD) PROTOCOL

This application is a continuation of application Ser. No. 07/907,951, filed Jul. 2, 1992 now abandoned.

CROSS-REFERENCE TO RELATED APPLICATION

This application is closely related to the subject matter of U.S. Pat. No. 5,410,535 entitled "Automatic Selection of an Interface for Ethernet Stations," by Henry Yang et al., assigned to the same assignee as this application.

BACKGROUND OF THE INVENTION

This invention relates generally to hardware interfaces between communication stations and various types of transmission media used in communication networks, particularly networks that employ an access protocol commonly referred to as Carrier Sense Multiple Access with Collision Detection (CSMA/CD). One widely used CSMA/CD protocol is commonly known as Ethernet. The CSMA/CD protocol is defined in ANSI/IEEE Std 802.3, published by the Institute of Electrical and Electronics Engineers, Inc., 345 East 45th Street, New York, N.Y. 10017, and referred to in this specification as "the IEEE standards."

Modern communications employ a variety of communication media, including twisted pairs of conductors, optical fibers, and coaxial cables. The equipment at each network station must obviously be designed differently to interface with these different media, and the IEEE standards make a logical separation of station equipment into media-dependent and media-independent functional modules. The media-independent modules include a physical signaling module (PLS), a media access control module (MAC), and a logical link control module (LLC). The media-dependent station equipment module is referred to as the media attachment unit (MAU).

Since the IEEE standard protocol supports different communication media, vendors of station equipment must provide support for connection to many, and ideally all, media types. Each medium type has different specifications for its connector, signal levels, transmission line signal conditioning, electrical isolation, and safety requirements. One approach to station design would be to provide a universal station that included media attachment units (MAUs) for every conceivable communication medium, but this would require costly and inefficient use of input/output (I/O) panel space and circuit board space in the station equipment. Moreover, the necessary profusion of connector types on each station would tend to be confusing to the average equipment user.

A typical compromise in station equipment design is to provide two external connectors: one to connect directly to a widely used twisted-pair communication medium, and the other to connect to another selected media type, through an external media attachment unit (MAU). This is in conformance with the IEEE standards, which defines station equipment (or data terminal equipment, DTE) in two permissible ways. First, the DTE can be defined to include all media-independent and media-dependent equipment, right up to the medium itself. In this case, the DTE includes an integral media attachment unit (MAU) for connection to a commonly used medium, such as a twisted-pair medium. In the IEEE standards, this mode of operation with a twisted-pair medium is referred to as 10BASE-T operation (pronounced ten-base-tee), and the connector for coupling to the twisted-pair medium is referred to as a 10BASE-T connector. The other way that the DTE can be defined is to include only the media-independent equipment, and exclude the MAU. In this configuration, an MAU is usually, but not necessarily, an external piece of hardware. In accordance with the IEEE standards, the MAU is coupled to the media-independent station equipment through an interface referred to as the attachment unit interface (AUI). The AUI is defined in the standard to include a connector that can be coupled to a variety of off-the-shelf MAU modules that can be purchased to connect to various communication media.

Therefore, a useful configuration for station equipment includes a 10BASE-T connector for coupling directly to twisted-pair media, and an AUI connector for connecting to another selected medium, through an appropriate external MAU. Nevertheless, this configuration has some significant disadvantages. One is that the standard AUI interface uses what is referred to as a 15-pin Sub-D connector with a slide-latch, at the station end of the interface. This connector is relatively large, so uses considerable space on the station, and is not as reliable as other connector types. Perhaps more important is the difficulty that a customer can still encounter in configuring a station to connect to a particular network. Basically, the customer must still choose which connector to use.

As will be appreciated from the foregoing, there is still a need for improvement and simplification in the manner in which station equipment is connected to various network media. The present invention provides a simple yet elegant solution to this problem.

SUMMARY OF THE INVENTION

The present invention is for use in a station that is connectable to more than one type of communication medium in a network that employs a Carrier Sense Multiple Access with Collision Detection (CSMA/CD) protocol. The invention resides in a common interface, comprising a first interface circuit, for conditioning and interpreting signals for communication with a network communication medium of a first type in accordance with a first protocol; a second interface circuit, for conditioning and interpreting signals for communication with a network communication medium of a second type in accordance with a second protocol; switching means for selecting between the first and second interface circuits; and a single connector for both the first and second interface circuits, and providing direct connection to a communication medium of either the first type or the second type. The single connector has shared pin assignments for at least some of the control or data signals transmitted through the connector from each interface circuit. The shared pin assignments are made in such a way as to minimize any adverse effects of accidentally connecting to a network that is incompatible with the selected interface circuit and its related protocol. Preferably, the first and second interface circuits are integrated into a single circuit chip.

More specifically, the first protocol is known as the 10BASE-T protocol, for connection to twisted-pair communication media; and the second protocol is known as the AUI protocol, for connection to other types of communication media. The preferred connector is of a common type known as a shielded MJ8 connector, having eight usable signal pins. In the presently preferred embodiment of the invention, one pair of connector pins is shared by data transmitted from the station in 10BASE-T mode and data input to the station in AUI mode; a second pair of pins is shared by data input to the station in 10BASE-T mode and a collision signal input to the station in AUI mode; a third pair of pins is unused in 10BASE-T mode and is used for data output from the station in AUI mode; and a fourth pair of pins is unused in the 10BASE-T mode and is optionally used for a power supply connection in the AUI mode.

In one embodiment of the invention, the switching means includes a manually operable gang switch. The switching means may be electronically operable and, in one preferred embodiment, includes means for automatically identifying the protocol used by the network to which the station is connected. More specifically, the means for automatically identifying the protocol used by the network includes means for enabling a first mode of operation of the station; means for determining whether the station operates properly in the first mode; means for continuing operation in the first mode if proper operation in that mode is determined; means for enabling a second mode of operation if proper operation in the first mode is not determined; means for determining whether the station operates properly in the second mode; and means for continuing operation in the second mode if proper operation in that mode is determined, and returning control to the means for enabling the first mode of operation, if proper operation in the second mode is not determined. Thus, the mode of operation is automatically selected, and the selection is maintained so long as improper operation in the selected mode is not detected.

In the disclosed embodiment of the invention, the first mode of operation is in accordance with the 10BASE-T standard using a twisted-pair communication medium, and the second mode of operation is in accordance with a standard attachment unit interface (AUI) for connection to a different medium type through an appropriate media attachment unit (MAU). In this embodiment, the means for determining whether the station operates properly in the first mode includes means for transmitting link test pulses onto the network and waiting for an appropriate response. The means for determining whether the station operates properly in the first mode may further include means for testing for the presence of input data signals when the station is not actively transmitting, whereby the input data signals on the transmit signal pair are indicative of network operation in the second mode. The means for determining whether the station operates properly in the second mode includes means for detecting the presence of a received data signal or a received collision signal while transmitting a packet of data from the station, whereby the absence of a data input signal or a collision signal indicates improper operation in the second mode.

It will be appreciated from the foregoing that the present invention represents a significant advance in the field of communication networks using the CSMA/CD protocol. In particular, the invention provides a single interface for a station to connect to a variety of communication media types. Connection to the twisted-pair media is provided through a 10BASE-T protocol, and connection to other media types is effected through an AUI protocol and an appropriate media attachment unit. Selection of the protocol used may be by means of a manual switch, or a switch actuated in response to tests made to determine the network protocol in use by the network to which the station is currently connected. Other aspects and advantages of the invention will become apparent from the following more detailed description, taken in conjunction with the accompanying drawings.

DESCRIPTION OF THE PREFERRED EMBODIMENT

As shown in the drawings for purposes of illustration, the present invention is concerned with improvements in interfacing network station equipment with network media of various types. Because stations have to be readily connectable to various media, station vendors have faced a dilemma in deciding how many interface connectors and media attachment units (MAUs) to provide with a station. A compromise solution is to provide a built-in MAU and connector for coupling to a commonly used medium, such as twisted-pair, and a standard interface (the AUI or attachment unit interface) to which other MAU's can be connected to provide a path to a variety of network media types.

In accordance with the invention, either of two types of network interfaces may be used by a station through a single connector of the same type that is normally used for the more commonly used interface. More specifically, two very important network interfaces are combined: a 10BASE-T interface to twisted-pair media, and an attachment unit interface (AUI) for a MAU which may be selected to connect to all media types.

Figure 1:
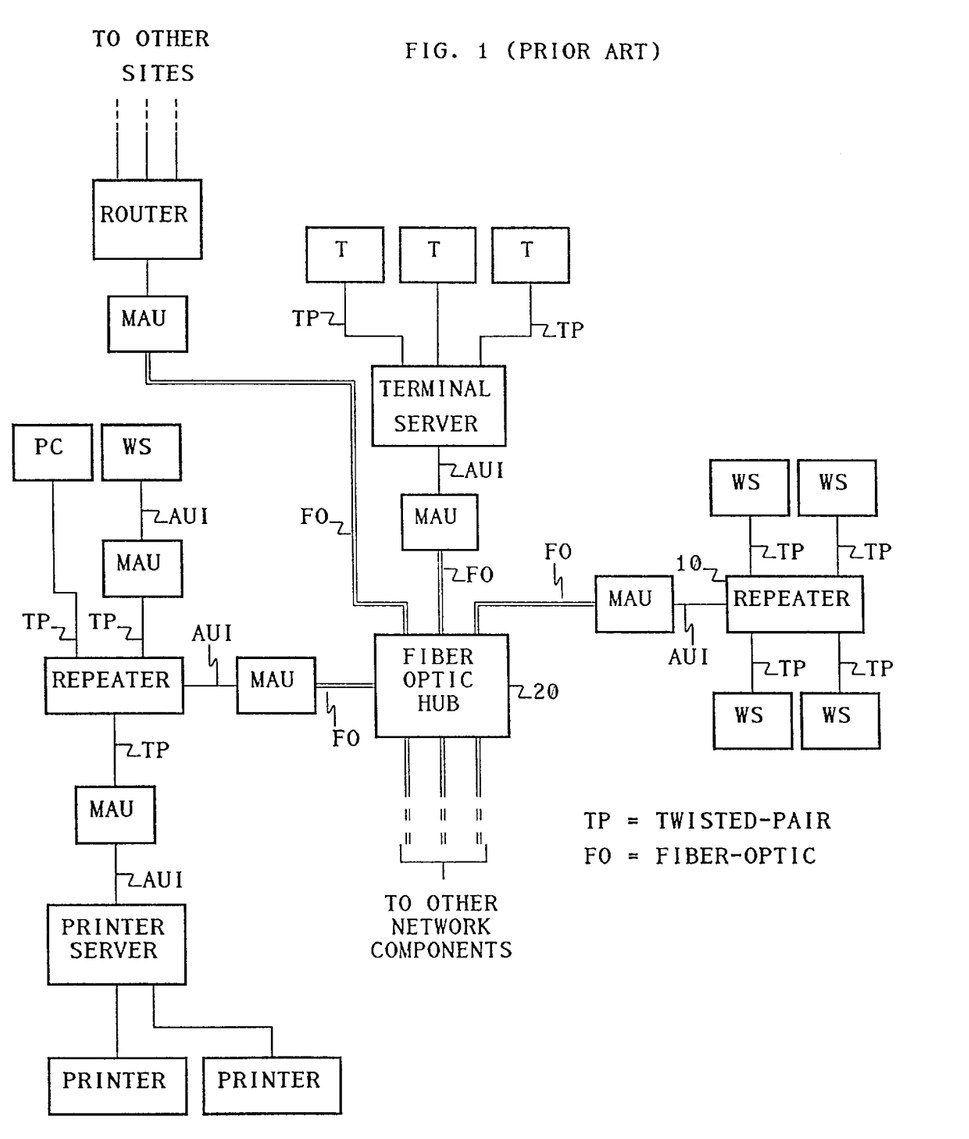
FIG. 1 is a simplified block diagram of a network configuration employing different transmission media.

FIG. 1 illustrates that a network configuration conforming with the IEEE standards may utilize a number of different communication media. For example, a repeater, indicated by reference numeral 10, is shown as connected to multiple workstations (WS) by twisted-pair media, but is also connected to a fiber optic hub 20. The relatively high cost of fiber optics devices dictates selection of an external media attachment unit (MAU), to which the repeater 10 is connected through an attachment unit interface (AUI). The repeater 10, therefore, must be capable of handling multiple connector types. Other examples of connection to media through MAUs may be observed in the figure. In general, however, there are only two basic configurations by means of which a station (or repeater, or server) is coupled to a communication medium. In one type of configuration, a station appears in the figure to be directly coupled to the medium. In this case, the MAU for the medium is integral with the station equipment. In the other type of configuration, a station is connected to the medium through an external MAU, which is connected to the station through an interface (AUI).

Figure 2:
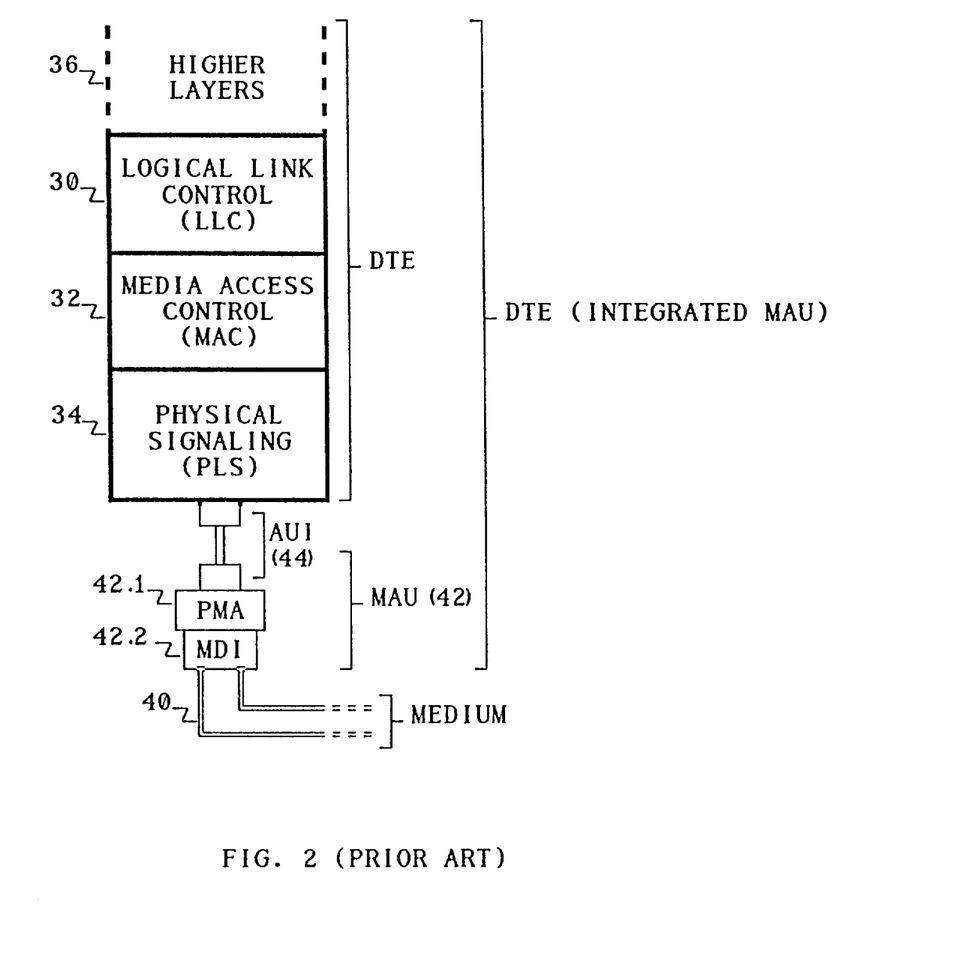
FIG. 2 is a fragmentary block diagram showing the lower layers of a CSMA/CD local area network (LAN) in accordance with ANSI/IEEE Std 802.3.

The relationship between the medium, the station equipment (or data terminal equipment, DTE), the AUI and the MAU is shown in more detail in FIG. 2. In accordance with the IEEE standards, a station connected to local area network (LAN) using the Carrier Sense Multiple Access with Collision Detection (CSMA/CD) protocol includes a logical link control (LLC) layer 30, a media access control (MAC) layer 32, and a physical signaling (PLS) layer 34, as well as higher layers, indicated at 36, logically positioned above the MAC layer. The structural and functional details of these layers are not important to the present invention, except to the extent that all of the aforementioned layers are structured independently of the type of communication medium, indicated at 40. In the general case shown, connection to the medium 40 is made through a media attachment unit (MAU) 42 structured for a specific medium type, such as for twisted pairs of conductors, optical fibers, and so forth. The MAU 42 includes a physical medium attachment (PMA) sublayer 42.1 and a medium-dependent interface (MDI) 42.2. The PMA 42.1 contains functional circuitry needed to interface with the specific medium 40, and the MDI 42.2 includes the mechanical and electrical interface with the medium. The mechanical and electrical interface between the PLS layer 34 and the MAU 42 is called the attachment unit interface (AUI), indicated at 44.

The IEEE standards define network station and repeater functions. In the context the discussion to follow, the difference between a station and a repeater element is unimportant and both elements will be encompassed by a single term, "station."

As also shown in FIG. 2, the station may be defined to include the MAU, or to exclude it. When the station includes the MAU, this simply means that the MAU is integrated into the station equipment and that the station can be directly connected to the communication medium. When the MAU is external to the station equipment, the AUI is needed to connect to a MAU selected to be compatible with a particular medium.

As can be seen from FIG. 1, a network configuration may include many different media types, but it would be costly and inefficient to integrate all possible MAUs into a station. A commonly employed compromise is to provide a built-in MAU for one medium, such as the twisted-pair medium, together with a connector conforming to standard specifications for the AUI. The AUI connector can then be used to attach an external MAU for connection to a desired medium of another type. This arrangement is shown in diagrammatic form in FIG. 3.

Figure 3:
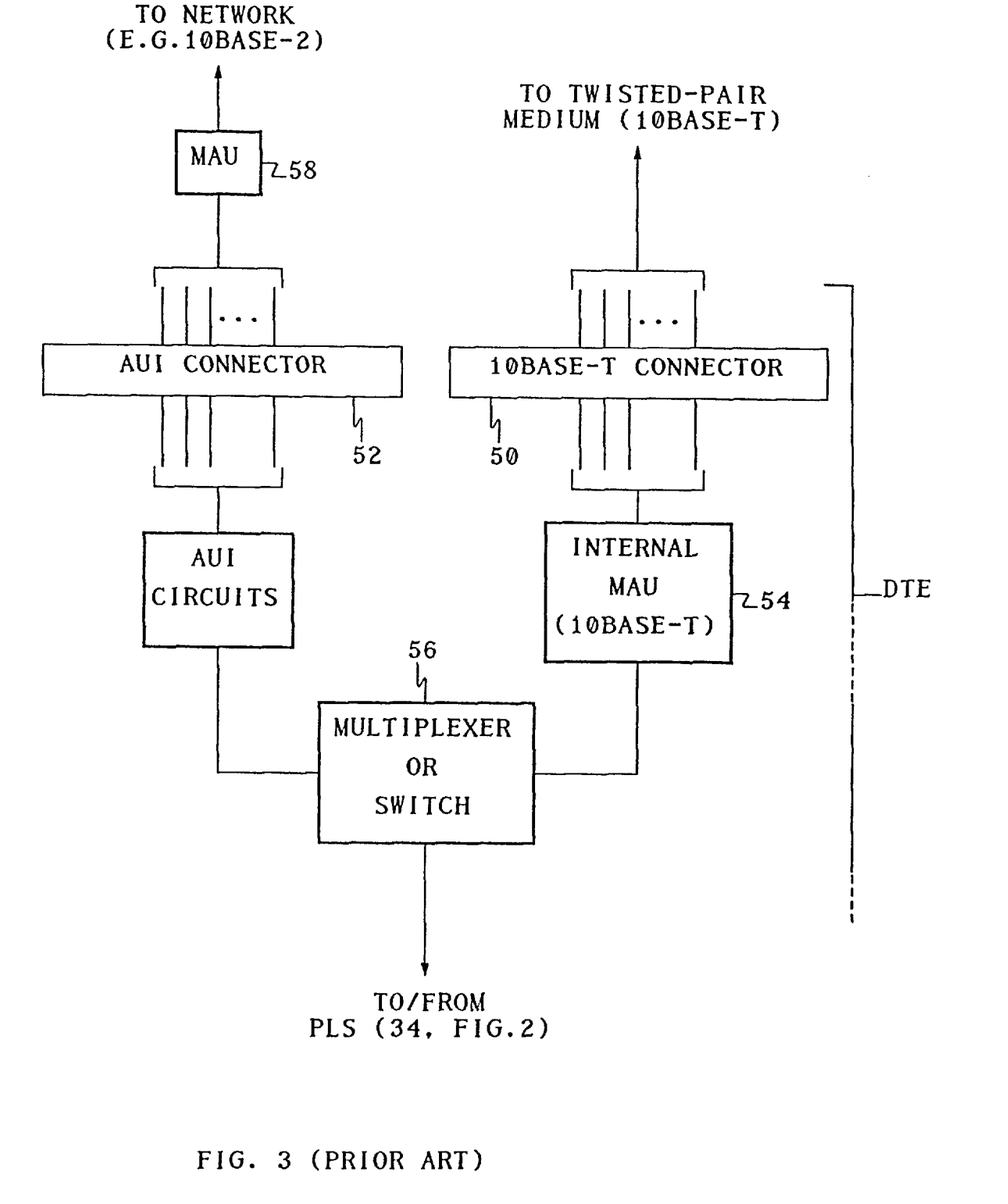
FIG. 3 is a block diagram depicting a conventional approach for connecting a station to one of two network medium types.

A typical station of the prior art includes two connectors 50 and 52 for attachment to a network. Connector 50 is a 10BASE-T connector defined in the IEEE standards as the appropriate connection for connection to a network using the Carrier Sense Multiple Access with Collision Detection (CSMA/CD) protocol and a twisted-pair communication medium. Since the 10BASE-T standard is widely used, many stations are designed and manufactured to include a 10BASE-T connector and an internal MAU 54 that conforms to 10BASE-T requirements. The other connector 52 is and AUI connector, typically of the type referred to as the 15-pin Sub-D connector. Connector 50 is wired to one set of input/output connections to a multiplexer or switch 56 through the internal MAU 54, and connector 52 is wired directly to another set of input/output connections to the multiplexer or switch. The switch 56 selects from these two sets of input/output connections and provides a selected set of input/output connections to the medium-independent portion of the station equipment, specifically to the physical signaling (PLS) layer 34 (FIG. 2).

In the station configuration depicted in FIG. 3, connection may be made to a twisted-pair communication medium, through the 10BASE-T connector 50, or to a communication medium of any type, through the AUI connector 52 and an appropriately selected external MAU 58. The multiplexer or switch 56 may be controlled manually or through station software, to select the appropriate path for the medium to which the station is to be connected. The disadvantages of this arrangement are that the normally used AUI connector 52 (the 15-pin Sub-D connector) is cumbersome and not always reliable, that the provision of two connectors adds to the cost of the station equipment, and that the station user must still make a proper choice of connectors and switch positions. The latter problem, concerning choice of connectors, has been addressed by some vendors by simply combining the two connectors 50 and 52 into one large connector having at least as many pins as the two separate connectors. However, this has little, if any, favorable effect on equipment cost, and provides yet an additional connector standard for the customer to deal with.

The present invention eliminates all of these disadvantages by combining the functions of the two interfaces (AUI and 10BASE-T) into a single compact connector, such as the well known shielded MJ8 modular connector. The use of a single connector on the station equipment substantially reduces manufacturing cost, but raises the possibility of misconfigurations. That is to say, a station might be configured for use as a 10BASE-T station but inadvertently connected to an AUI, or vice versa. As will be explained in more detail, pin assignments in the single connector used in the invention are made with a view to minimizing adverse effects on the network that might result from misconfigurations.

The specific details of the invention will be better understood if the functions of the AUI and 10BASE-T interfaces are first briefly described. As already mentioned above, the AUI interface is used for connecting a station or a repeater to an MAU that connects directly to the communication medium. The AUI is said to be asymmetrical, i.e. electrically and mechanically the station side of the interface is different from the MAU side of the interface. The station provides output data and power to the interface, and receives input data and a collision signal. The MAU side of the AUI must drive signals for input data and a collision, while receiving output data and power from the station. Mechanically, an AUI connector cable is also asymmetrical and has a connector type at one end that will only mate with a connector on the station.

On the other hand, the 10BASE-T interface is symmetrical and is always configured as a point-to-point, duplex communication path between two 10BASE-T MAUs, each of which may be integral to a station or external to a station. In a 10BASE-T system, a collision is detected in an MAU by the simultaneous presence of transmit and receive signals on the 10BASE-T medium. A 10BASE-T cable assembly has only two signal paths, transmit data (TD) and receive data (RD), and is significantly simpler than the AUI cable assembly.

The protocols for AUI and 10BASE-T are very different and many problems can result from misconfigurations. The misconfigurations discussed below are prevented in the prior art, in practical terms, by the use of incompatible connectors. Operating both protocols on a single connector means that different protocols may be operated by the attachments on two ends of one cable. Misconfigurations that were unimportant in the prior art become of primary importance. Two examples of importance and catastrophic interactions of the 10BASE-T and AUI protocols are provided below.

A first example involves the interconnection of a 10BASE-T transmit data function with the AUI interface output data. The MAU will receive and repeat to the network medium the signals received on the AUI output data function. In this misconfiguration, signals called "link test pulses" in the 10BASE-T transmit data function will pass through the MAU and corrupt data packets on the network media. Link test pulses are several bit times long and occur at a regular interval, which may be as often as eight milliseconds. Each link test pulse that coincides with a data packet transmission on the network (connected by the MAU) will result in that transmission being lost as if corrupted by noise. Analysis not difficult for those skilled in the art reveals that up to 50% of network data transmissions may be lost due to this effect and the network would be completely dysfunctional. The loss rate for a network is generally designed to be less than 0.1%. How this misconfiguration is prevented is discussed subsequently in this detailed description.

A second example of a problem resulting in misconfiguration occurs if a station may receive data from a connection but does not transmit successfully over the same connection. This case can result if the input data of the MAU's AUI interface is received by the 10BASE-T receive data function. This problem is solved for the AUI and 10BASE-T individually in the prior art but unsolved when the protocols operate in the misconfigured fashion. The result is that a segment of network stations may transmit to but not receive from another segment of the network. In the situation considered, the station operating the 10BASE-T protocol may easily achieve the status "link test pass" for the protocol. This result, called "intransitivity," is often a difficult fault to diagnose, localize and repair. Diagnostic tools commonly employed in the station operating a 10BASE-T protocol may not even indicate a failure in a loop-back type of test. The ability to diagnose and localize faults is generally accepted as a requirement for the design of network stations and is provided by the invention, as will be discussed later.

There are many differences in the AUI and 10BASE-T protocols. In fact, even the protocol for the most fundamental aspect of CSMA/CD is different; even the collision detection protocols are incompatible. Those skilled in the art will appreciate that many additional problems must be solved to insure that network operation is protected from misconfiguration possible when 10BASE-T and AUI share a single interface connector. An important aspect of the invention is that network operation is not interrupted and equipment is not damaged when inappropriate but connector-compatible equipment and cables are used together. These misconfigurations are to be considered reasonable actions for an uninformed operator or untrained user.

Figure 4A:
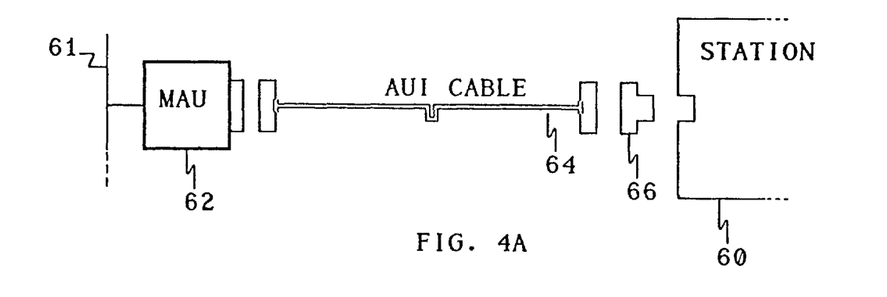
FIGS. 4A and 4B are diagrams depicting two possible configurations using the common interface in accordance with the present invention.
Figure 4B:
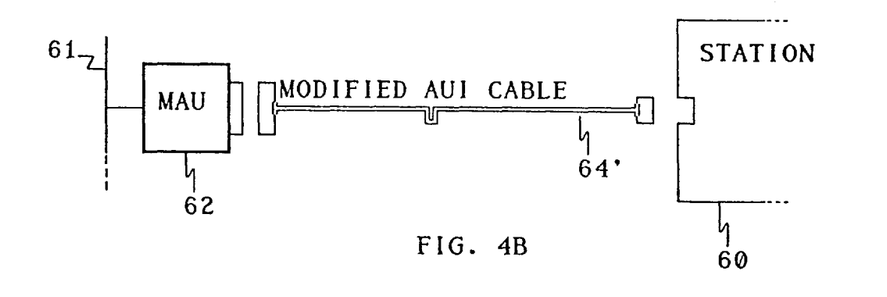
Figure 4C:
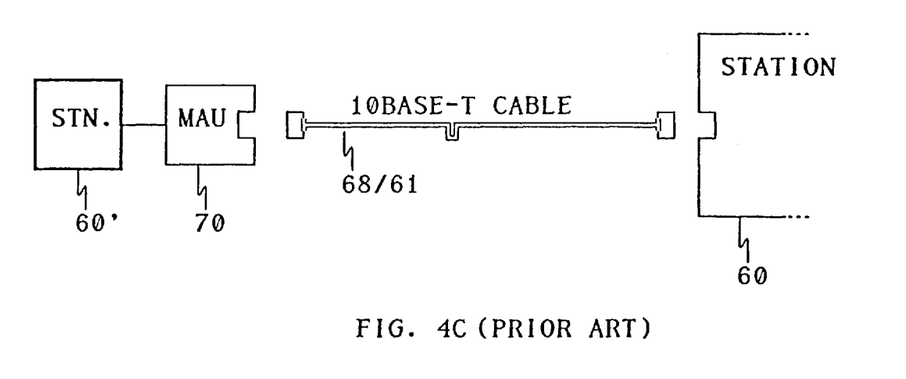
FIG. 4C is a diagram depicting how the common interface of the invention may be connected to another station in a configuration of the prior art.

FIGS. 4A–4C show three methods for connecting a MAU to a station that implements the common interface of the invention. FIGS. 4A and 4B show two methods of connecting a station 60 to a communication medium 61 through an AUI and an external MAU 62. In the first method, the AUI includes a conventional AUI cable assembly 64, having a 15-pin SubD connector at each end. The cable assembly 64 is coupled to the external MAU 62 and to a 15-pin SubD to MJ8 adapter 66 at the station end. The adapter 66 is then connected directly to an MJ8 connector built into the station 60. In the method of FIG. 4B, the adapter is eliminated in favor of a modified AUI cable assembly 64', having an MJ8 connector wired to one end, for direct connection to the station 60. FIG. 4C shows how the station 60 may be connected as in the prior art, through a 10BASE-T cable assembly 68, having an MJ8 connector at each end. The cable assembly 68 is part of the twisted-pair medium 61, and connects at its other end to another MAU 70, which may be integral or external to another station 60'.

An important aspect of the invention is the manner in which pin assignments are shared in the shielded MJ8 used in the disclosed embodiment of the invention. This is shown in the following table.

| Shielded MJ8 Pin | 10BASE-T Interface | AUI Interface |
| --- | --- | --- |
| 1 | TD+ | DI− |
| 2 | TD− | DI+ |
| 3 | RD+ | CI+ |
| 4 | Unused | DO+ |
| 5 | Unused | DO− |
| 6 | RD− | CI− |
| 7 | Unused | +12v |
| 8 | Unused | Return |
| Shield | Chassis ground | Chassis ground |

As shown in the table, when the 10BASE-T interface is active pins 1 and 2 of the MJ8 connector are used for transmit data (+ and −, respectively), and pins 3 and 6 are used for receive data (+ and −, respectively). Note, these pin assignments correspond to those specified for the 10BASE-T MDI. The standards also specify another pin assignment called "MDI-X," for "embedded crossover function" which, though not shown, may be used by the invention. When the AUI interface is active, pins 1 and 2 of the MJ8 connector are used for data-in signals (− and +, respectively), pins 4 and 5 are used for data-out signals (+ and −, respectively), and pins 3 and 6 are used for a collision-input signal (+ and −, respectively). Pins 7 and 8 may be used for a 12-volt power line and return line, respectively.

The MJ8 pin assignments for 10BASE-T operation conform with the IEEE standards. Basically, there are two twisted pairs of conductors, one for transmitted data and one for received data. There is no requirement for shielding, nor for power to be supplied through the interface.

The AUI standard specifies connections to fifteen pins, including four individually shielded signal pairs and a shielded pair of wires to conduct station-supplied power to the MAU. A subset of the AUI standard configuration is used in most Ethernet products, such as those manufactured by Digital Equipment Corporation. The subset, which has been adopted in the common interface of the invention, includes three signal pairs referred to as Data Out (DO+/−), Data In (DI+/−) and Collision In (CI+/−), one pair of power wires (12v+/−), and a overall shield.

A primary requirement in choosing pin assignments is that a misconfiguration must not interrupt network operation. In the common interface of the invention, the same two pins (1 and 2) are used for receiving data from the MAU (DI−/+) and for transmitting 10BASE-T data to the network (TD+/−). Further, the AUI collision signals (CI+/−) appear on the same pair of pins (3 and 6) that are used to receive 10BASE-T data (RD+/−). Because the Data In (DI) signals and the Collision In (CI) signals in the AUI interface are generated in the MAU, i.e. the signal lines 1–3 and 6 are connected to drivers in the MAU, there is no risk to the integrity of the network if the 10BASE-T signals (the transmit-data signals) were to be inadvertently transmitted to the MAU through the AUI. Specifically, none of the 10BASE-T signals, on pins 1–3 and 6 could be received by the MAU and repeated onto the network in the event of a misconfiguration.

Another feature that reduces the effect of misconfiguration is that the AUI Data In (DI) signal is inverted before being driven onto the 10BASE-T medium (e.g. in adapter 66 of FIG. 4A), and is again inverted by the station after being received. This inversion, together with the effect of Manchester encoding employed in accordance with the IEEE standards, ensures that 10BASE-T data will not be received by a station in AUI mode, or due to misconfiguration. Manchester data decoding is polarity dependent, such that a logic "1" is decoded as a logic "0" if the incorrect interface is used.

The AUI Data Out pair (DO+/−) is assigned to pins 4 and 5, which are not used in the 10BASE-T mode of operation. This choice is necessitated by the 10BASE-T standard, which permits two types of stations: one with the data transmit and receive signals as shown and one with their positions reversed. Moreover, 10BASE-T cable assemblies may include a "cross-over" cable, which swaps the pin positions of the transmit and receive signals from one end of the cable to the other. Therefore, if the AUI DO signal pair were to be shared with either of the 10BASE-T data signal pairs, there would be the potential for the 10BASE-T data signals to be received by the AUI attachment and incorrectly repeated onto the network. Link test pulses used in the 10BASE-T transmit data function would pass through the MAU and would corrupt data packets on the network. With the pin assignment as presented in the above table, the impact of misconfiguration is practically eliminated. In the event of a misconfiguration, i.e. when a selected interface is not the same as the externally connected device, then the signal DO signal driver in the station will be without connection to the external device. This pin assignment has the additional advantage that signals received by the station may be used to ascertain the nature of the attached device.

Another difficulty that the present invention anticipates is the inadvertent connection of a data terminal to a telephone line, many of which also use MJ8 modular connectors. The AUI DO signals are assigned to pins 4 and 5, which are also used in telephony for signals usually referred to as the "tip" and "ring" signals. In the event that a station is inadvertently connected to a telephone line, the telephone ring current could damage the station. In the presently preferred configuration of the invention, the connections from pins 4 and 5 are capacitively coupled to the station, to filter out telephone ring signals, which are of relatively low frequency.

The 12-volt power signals needed for the AUI interface were assigned to pins 7 and 8 because these pins are not used for 10BASE-T equipment and, as far as is known, for telephone or other applications of the MJ8 connector. Other, more detailed aspects of the common interface of the invention will be discussed below after two approaches to implementation are described.

Figure 5:
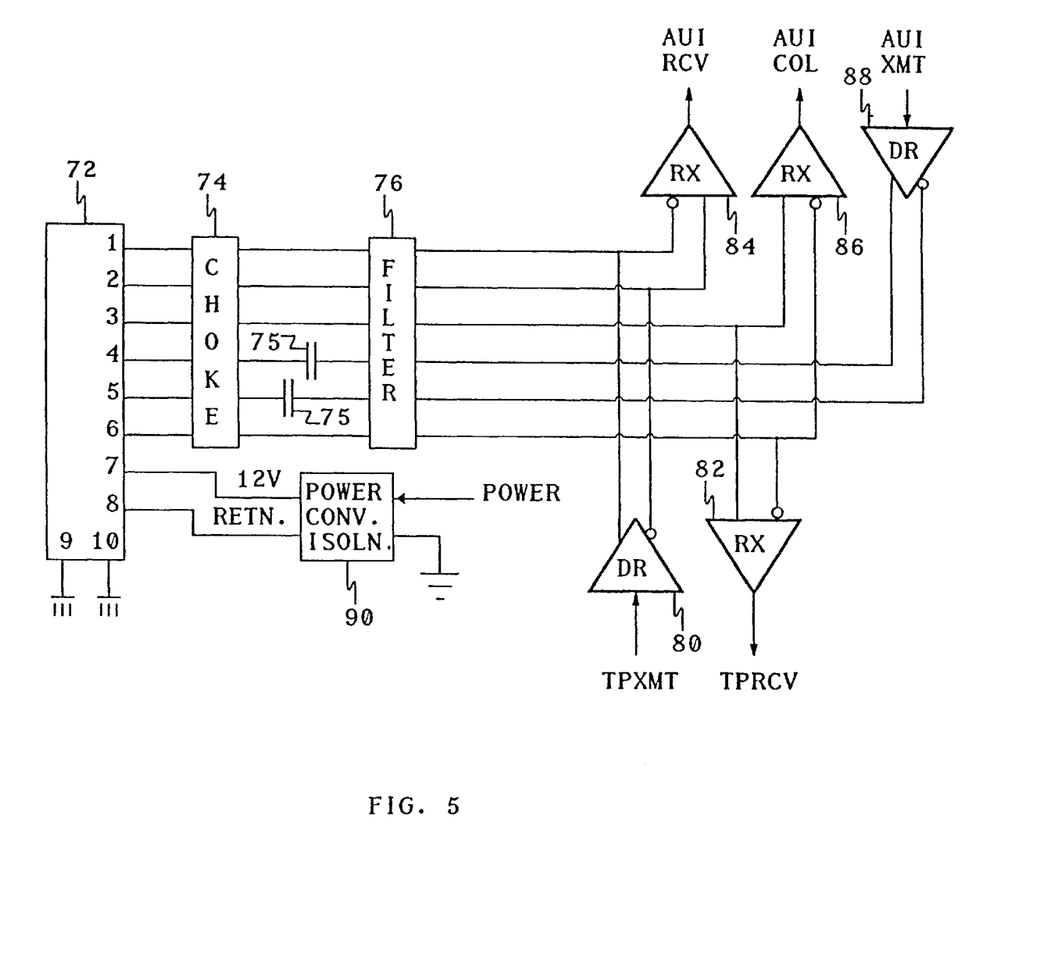
FIG. 5 is a block diagram depicting a first embodiment of the present invention, using a custom interface chip to interface with station equipment.

FIG. 5 depicts the details of combining the signals of an AUI and 10BASE-T connector in accordance with the invention. The common interface includes a shielded MJ8 connector 72 having the same pin assignments as discussed above, and conventional choke and filter circuits (74 and 76, respectively) connected in signal lines from pins 1–6 of the connector. For the twisted-pair interface, the circuit shows the final driver 80 for the twisted-pair transmit data signal, to produce the TD+/− signals on signal lines corresponding to pins 1 and 2 of the connector 72, and a receiver 82 for generating a twisted-pair receive signal from RD+/− inputs received over signal lines corresponding to pins 3 and 6 of the connector. Only the final driver and first receiver for 10BASE-T are shown. Additional circuitry implementing the 10BASE-T function is not shown in FIG. 5, but is discussed later. For the AUI, FIG. 5 includes a receiver 84 for generating an AUI receive data signal from DI−/+ inputs received over signal lines corresponding to pins 1 and 2 of the connector 72, a receiver 86 for generating an AUI collision signal from CI+/− inputs received over signal lines corresponding to pins 3 and 6 of the connector, and a driver 88 for the AUI transmit data signal, to produce the DO+/− signals on signal lines corresponding to pins 4 and 5 of the connector.

As also shown in FIG. 5, the lines corresponding to pins #4 and #5 between the choke 74 and the filter 76 each contain a series capacitor, indicated by reference numeral 75, which may have a capacitance of approximately 0.2 microfarad. The capacitors 75 prevent coupling of low-frequency ringing signals from a telephone circuit to which the interface might be inadvertently connected. Another feature of the circuit shown in FIG. 5 is that inputs to the AUI receiver 84 are inverted with respect to the normal 10BASE-T connection, to prevent reception of 10BASE-T data, which is conducted from pins #1 and #2 of connector 72 when a 10BASE-T is misconfigured external to the station.

Also shown in FIG. 5 is a power supply 90 for supplying 12-volt power, optionally, to pins 7 and 8 of the connector 72. The power supply is designed to meet the isolation requirements of the 10BASE-T standard and is protected against short-circuit and over-voltage faults. The power supply function can be removed from the station equipment if there is a concern that any external components, such as in telephone equipment, might react adversely to a 12-volt line level in a misconfiguration condition. In such a case, an external power supply can be used, supplying the 12-volt power through an external cable adapter. Then the 12-volt supply will be provided only to the AUI media and the issue of adverse effects of a misconfiguration is avoided.

The 10BASE-T standard specifies electrical isolation requirements for the signals lines, and these requirements are met in the interface of the invention by means of the filter 76, which provides up to a 3 kv isolation level and is similar in design to a conventionally used 10BASE-T component. The isolation thus provided exceeds the requirements of the AUI specification.

Figure 6:
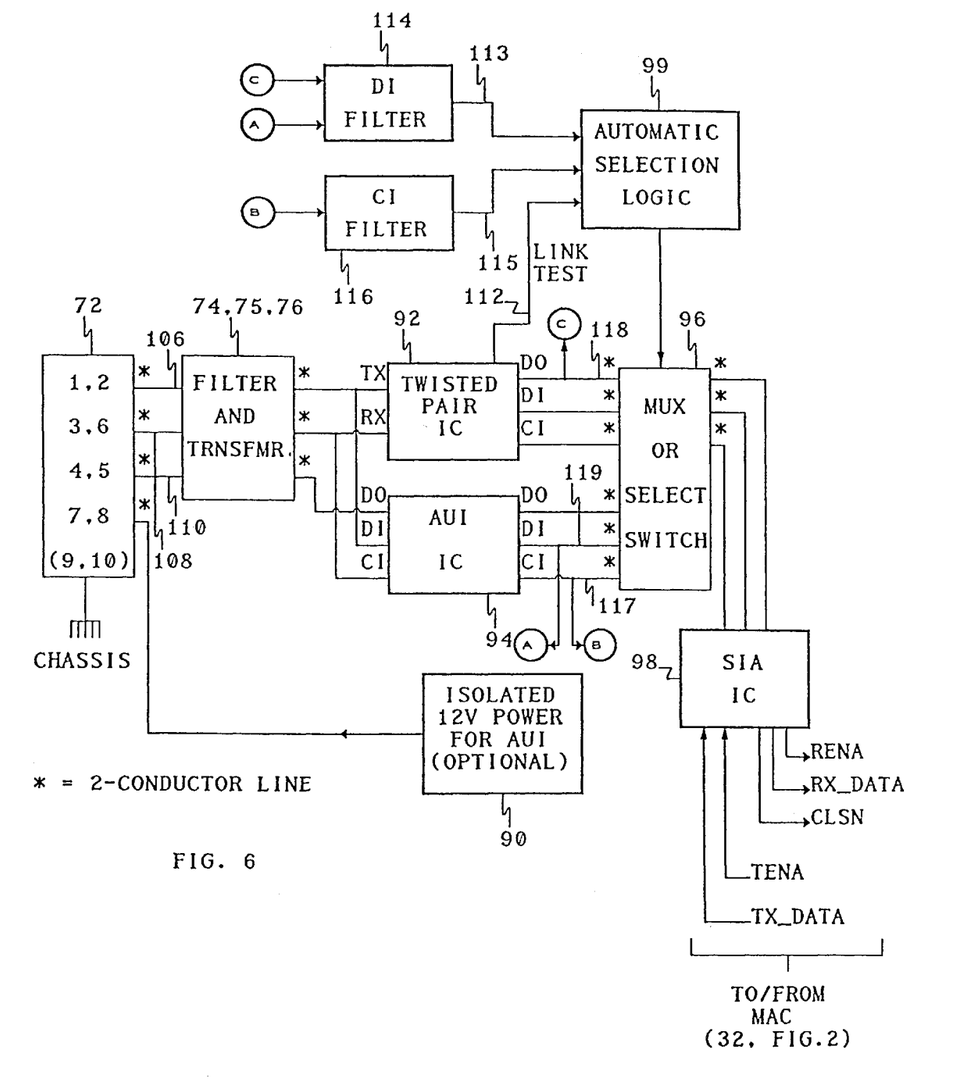
FIG. 6 is a block diagram depicting a second embodiment of the present invention, using existing interface chips for twisted-pair and AUI interfaces.

FIG. 6 shows an implementation of a station including the invention, using off-the shelf interface chips 92 and 94. As in FIG. 5, the signal lines 1–6 of the MJ8 connector 72 are connected to a filter and transformer, referred to as 74, 75, 76. Then the lines are connected in appropriate pairs to the chips 92 and 94. Chip 92 is a twisted-pair integrated circuit (TPIC) that provides the MAU function for 10BASE-T and is available in the industry from several vendors. Chip 94 is an AUI integrated circuit (AUI-IC), which provides AUI driver and receiver functions and is also widely available, under the designation 75ALS085. The TPIC 92 is connected to signals corresponding to pins 1 and 2 (for TD+/−) and to signals corresponding to pins 3 and 6 (for RD+/−). The chip derives the TD signals from a Data Out (DO) signal, derives a Data In (DI) signal from the RD signals, and derives a Collision In (CI) signal from the states of both the TD and RD signals. The DO, DI and CI signals are all coupled to a multiplexer (MUX) or selector switch 96.

The AUI-IC 94 performs a similar function for the AUI. The AUI-IC is connected to pins 4 and 5 (the DO signals), pins 1 and 2 (the DI signals) and pins 3 and 6 (the CI signals). These three signal pairs are coupled from the AUI-IC 94 to the MUX or selector switch, the function of which is to select one set of signals, either those connected to the TPIC 92 or those connected to the AUI-IC 94, for connection to the another standard chip 98, referred to as the SIA IC (Serial Interface Adapter) IC, which is the first-encountered chip in the media-independent portion of the station equipment. The SIA IC 98 performs conventional Ethernet encoding and decoding functions, and is available as AMD part number 7992.

The MUX or selector switch 96 may take the form of a manual gang switch, switchable between two positions to select either the 10BASE-T mode or the AUI mode of operation. The circuit of FIG. 6 will change form slightly depending on the type of switching that is used. For a gang switch, the AUI chip may not be needed. A gang switch will commonly preserve the analog character of the signals that are switched. The DO, DI, and CI signals from/to and SIA chip are often not simple logic levels, but include the AUI driver and receiver functions. The SIA chip may be directly connected to a signal isolation transformer for AUI. The AUI IC 94 of FIG. 6 would not be included for cost reasons.

Alternatively, the switching device 96 may take the form of an electronic switch operable by logic signals and commonly called a MUX. A MUX typically switches logic signals and the AUI IC 94 is required as shown in FIG. 6 to provide the analog driver/receiver functions for the AUI interface. The extra component is included in the preferred embodiment of the invention to allow electrical control of the switch function 96. The invention is described in terms of existing components. An alternative implementation would have a single VLSI chip to implement functions for AUI and 10BASE-T, including items 92, 94 and 96 in one part. This reduces the cost, as interfaces between these three parts involve a lot of component pins. In particular, twenty-four component pins are eliminated for the single-part implementation.

The MUX or selector switch 96 may be electronically switchable under software control, as directed by the station user. In the preferred embodiment of the invention, the MUX or selector switch is an electronic switch controlled automatically as a result of signals that sense the nature of the device attached to the connector 72. This autoconfiguration process involves having the station transmit certain signals and observe the signals received from the communication medium and the attached device; then modify its mode of operation as appropriate. This process is controlled by automatic selection logic 99, which transmits control signals to the MUX or selector switch 96.

Two factors make autoconfiguration possible. One is the use of a signal path for the AUI data transmit function (the DO+/− signals) that is never connected to a 10BASE-T receiver function in the second station. Also, the 10BASE-T TX function is never connected to an external MAU's DO input. This allows the station to transmit a signal without first knowing the external configuration of the equipment. The received response may then be observed and the operational mode may be modified depending on the nature of the response.

The second factor that makes autoconfiguration possible is that signal activity by an attached device is provided by the AUI and 10BASE-T protocols. In particular, and as viewed from the station end of a connection, the 10BASE-T protocol provides for "link test pulses" to be transmitted onto the communication medium and received by the station. The AUI specification requires the MAU to "echo" transmitted data (DO) from the station onto the station's receive data path (DI). Using these facts and local knowledge of the station transmitter activity, the station may ascertain the presence and nature of the attached device. A specific procedure for achieving this function is discussed below.

As also shown in FIG. 6, the automatic selection logic 99 has three principal inputs: a link test signal on line 112 from the twisted pair IC 92, a filtered DI status signal on line 113 from a DI filter circuit 114, and a filtered CI status signal on line 115 from a CI filter circuit 116. The DI filter circuit 114 has as inputs the signal (through connection C) from circuit 118 (FIG. 6), and the signal (through connection A) from circuit 119 (FIG. 6). The CI filter circuit has only one input, the collision input (CI) signal derived (through connection B) from circuit 117 (FIG. 6) from the CI line between the AUI IC 94 and the MUX 96. Understanding how the automatic selection logic 99 operates requires a more detailed discussion of the filter circuits 114 and 116, which are shown in FIGS. 8A and 8B, respectively.

Figure 8A:
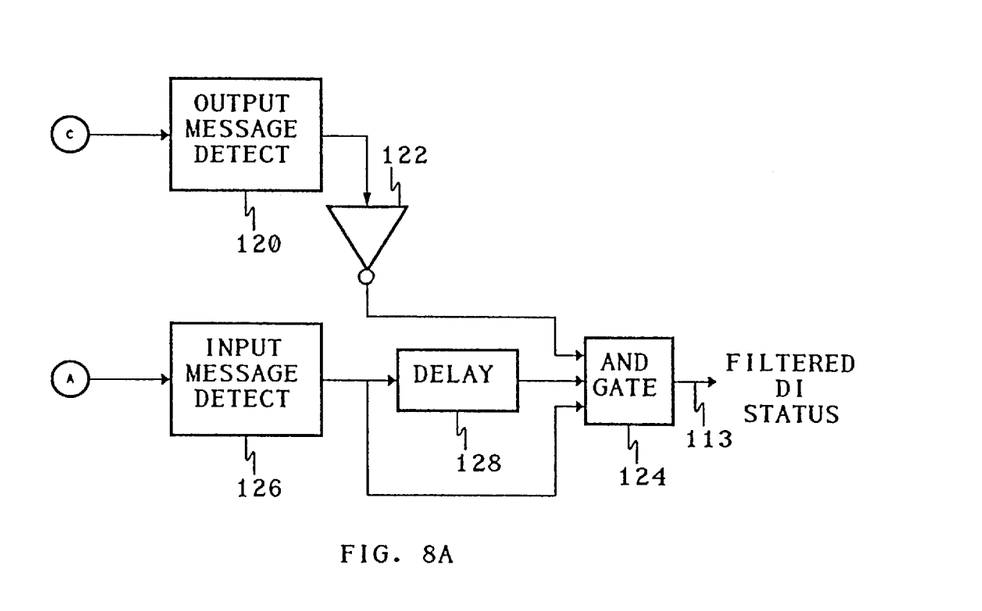
FIGS. 8A and 8B are schematic diagrams of filter circuits to provide a filtered data input (DI) status and a filtered collision input (CI) status, respectively, for the AUI interface.

The DI filter circuit in FIG. 8A detects the presence of a data input signal (on line 106 in FIG. 4) when the station is not transmitting either a packet or a link test pulse. An Output Message Detect function 120 detects the presence of an outgoing message (also called a transmit packet) using the signals (through connection C) from circuit 118 (FIG. 6). When an output message is present, the Output Message Detect function 120 drives its output line to a logic high signal. This signal is inverted by an invertor 122 and is input to an AND gate 124. Therefore, the AND gate 124 is disabled when there is an output message on circuit 118. An Input Message Detect function 126 looks for the presence of an input message from the twisted-pair signal TX. The Input Message Detect function 126 monitors the circuit 119 (connection A) for input messages and link test pulses, and produces a logic high signal when either an input message or a link test pulse is present. The signal is connected both as a direct input to the AND gate 124, and as a delayed input after processing by a delay circuit 128. The effect of the delay circuit 128 is to filter out any signal of less than one microsecond in duration, which effectively filters out signals produced by link test pulses. Thus, the Filtered DI Status does not respond to the output message transmitted by this station and the link test pulses from any source.

Figure 8B:
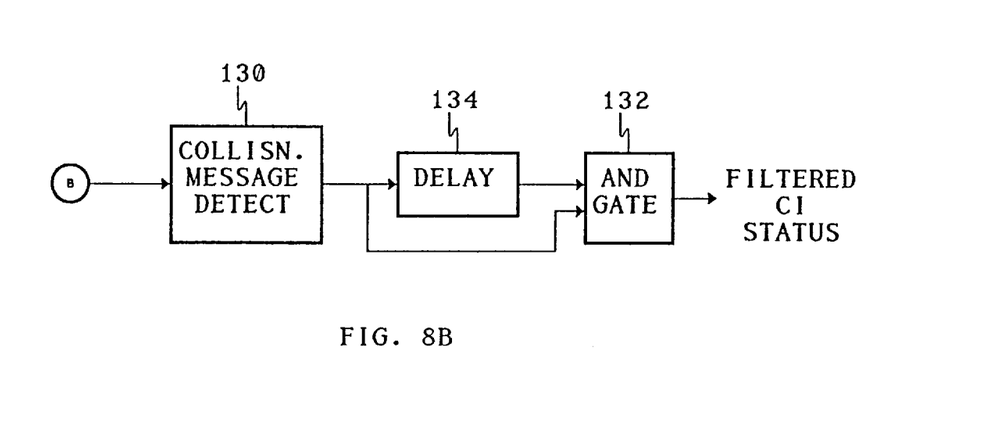

The CI filter circuit in FIG. 8B filters out messages that are shorter than one microsecond, which includes any link test pulses. A Collision Message Detect function 130 monitors the CI signal on circuit 117 (connection B). The Collision Message Detect function 130 drives its output to a logic high signal when it detects activity on its input. The signal is connected both as a direct input to an AND gate 132, and as a delayed input after processing by a delay circuit 134. The effect of the delay circuit 134 is to filter out any signal less than one microsecond in duration, which effectively filters out signals produced by link test pulses. Thus, the Filtered CI Status does not respond to 10BASE-T link test pulses.

When the station is configured to operate in 10BASE-T mode, but the filtered DI status signal is active or high, the station is receiving a signal over its 10BASE-T transmit line. This condition indicates a misconfiguration.

For a misconfiguration in which the station is mistakenly switched to AUI mode, without the benefit of the CI filter circuit 116 the station could falsely interpret link test pulses received from the network as collision signals. The filter circuit 116 avoids this potential difficulty.

Figure 7:
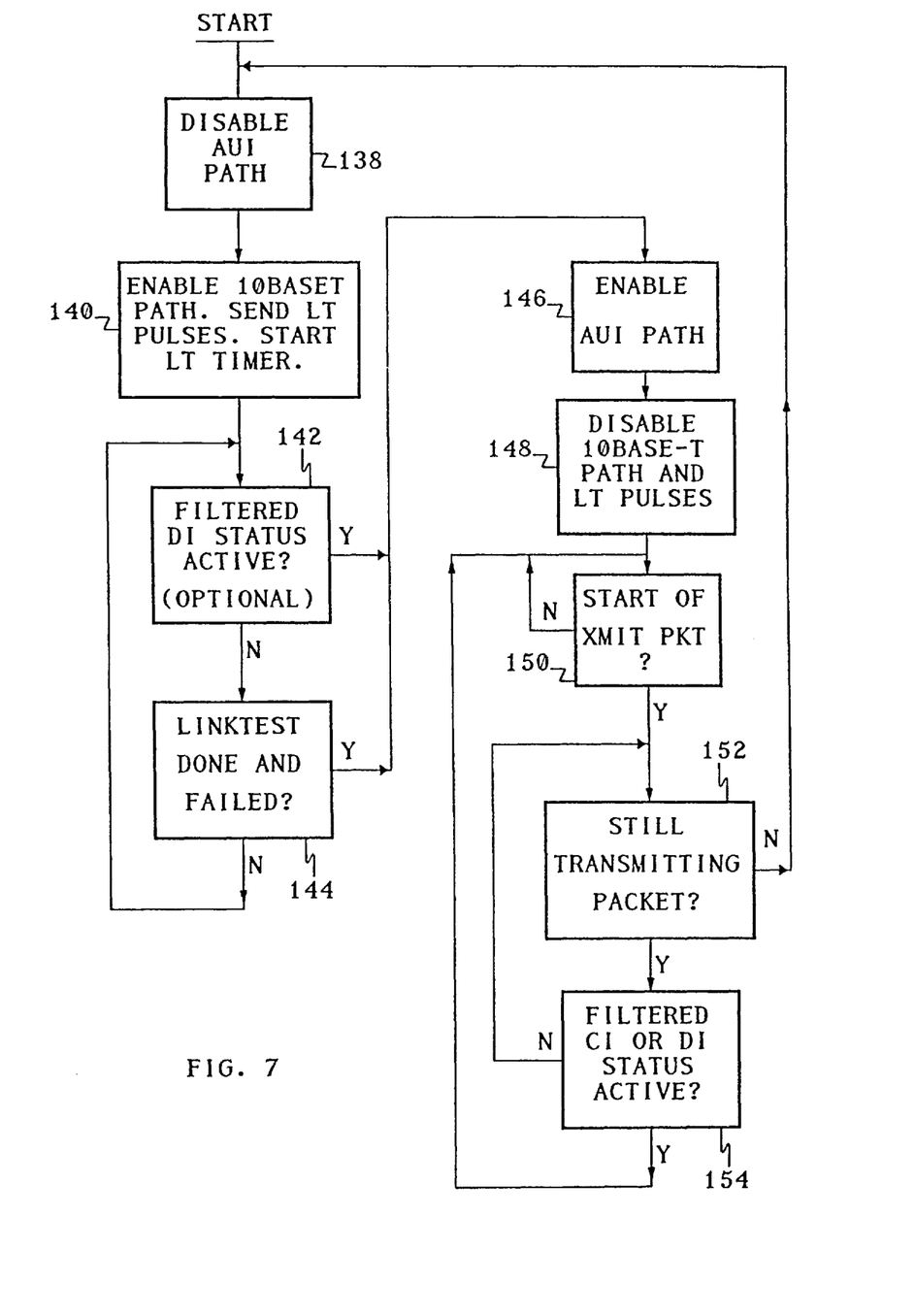
FIG. 7 is a flowchart of an autoconfiguration algorithm used in accordance with one aspect of the invention.

Operation of the autoconfiguration algorithm can best be described in terms of a flowchart, shown in simplified form in FIG. 7. It will be understood that the algorithm may be implemented in hard-wired form, or as software or firmware. The algorithm operates in two main loops, corresponding to the 10BASE-T and AUI modes. The autoconfiguration algorithm is illustrated as starting operation in the 10BASE-T mode, in block 138, although operation could just as well have started in the AUI mode. As shown in blocks 138 and 140, respectively, first the AUI path is disabled and the 10BASE-T path is enabled. Enabling one mode or the other is accomplished by actuating an electronically controlled switch, such as the switch 56 (FIG. 3) or the switch 96 (FIG. 6). After the 10BASE-T mode is enabled, the algorithm initiates a standard link test procedure, by transmitting link test (LT) pulses and starting a link test timer, as also indicated in block 140. This is a standard 10BASE-T test defined in the IEEE standards. Basically, if a response to the LT is not received by the station within a preselected time it is assumed that no 10BASE-T connection has been established with the network.

The next step in the 10BASE-T loop, shown in block 142, is to test for the presence of a data input signal (on line 106 in FIG. 6), using the DI filter function. This condition, if present, would indicate incorrect 10BASE-T operation. The test made in block 142 is performed by examining the state of a filtered DI status signal output from the DI filter circuit 114 (FIG. 6). For purposes of the present invention, the block 142 test is optional, since the next test (block 124) is sufficient to determine the appropriate mode of operation. A less costly implementation is obtained if the test of block 142 is omitted. In block 144, it is determined whether the link test is complete and whether the test failed. If so, the station is assumed to be not connected to a 10BASE-T network. If the test, or tests, of blocks 142 and 144 determine that the network is operating in 10BASE-T mode, the test, or tests, are repeated and the algorithm stays in the 10BASE-T loop on the left-hand side of FIG. 7.

If either of the tests of blocks 142 and 144 determines that the network is not operating in 10BASE-T mode, the AUI-mode loop is entered, beginning at block 146, which enables the AUI path. As shown in block 148, the 10BASE-T path of operation is simultaneously disabled, and action is taken to disable further transmission of LT pulses. The next step, shown in block 150, is to wait for the start of a transmitted packet. Once a packet begins transmitting in AUI mode, such as on the DO line 110 in FIG. 6, the algorithm monitors the data input (DI) and collision input (CI) signals on lines 106 and 108. At some time during the transmission of a packet, one of these lines should become active, indicating either echoed data or a collision for access to the network. If the packet transmission ends without activity on the DI or CI lines, there is assumed to be no operation in the AUI mode. The test in block 152 determines if packet transmission is still taking place, and is applicable to packet transmissions that take a longer time than the roundtrip delay of the network. If a packet transmission is still taking place, the step in block 154 checks the filtered DI status and filtered CI status. If filtered DI or filtered CI activity is found, the algorithm returns to waiting for the start of another packet, i.e. to block 150. If no filtered DI or CI activity is found, the algorithm keeps checking for the end of the transmitted packet (in block 152). Thus, so long as the packet is still being transmitted there will be repeated tests for filtered DI and CI activity. If any such activity is detected, the algorithm will wait for the next packet (in block 150), and the AUI path will remain enabled. If no filtered DI or CI activity is detected during the transmission of an entire packet, the result of the test in block 152 will be negative and control will return to block 138, to enable the 10BASE-T mode of operation.

From the foregoing description of FIG. 7, it will be apparent that the autoconfiguration algorithm will switch automatically to the appropriate mode of operation, and will continue to test for proper operation in the selected mode. The algorithm may be implemented in software form, but is probably best implemented in hardware form in the station network interface, near the mode switch 56 or 96. Ideally, the algorithm should be integrated with the switch and the 10BASE-T and AUI interface logic, on a single chip.

It will be appreciated from the foregoing that the present invention represents a significant advance in the field of network communication, and particularly in the design of network station equipment that will interface conveniently with a variety of media types. The invention combines the two most popular interfaces in an Ethernet (CSMA/CD) network, and eliminates the standard AUI 15-pin Sub-D connector, in favor of a single shielded MJ8 connector that can be used to connect directly to a medium of the 10BASE-T type, or indirectly, through an attachment unit interface (AUI) and an external media attachment unit (MAU), to a medium of a different type. Use of the invention lowers the component count and significantly reduces the cost of the interface. It also reduces I/O panel and printed circuit space requirements for the station.

It will also be appreciated that specific embodiments of the invention have been described in detail by way of illustration, and that modifications may be made without departing from the spirit and scope of the invention. Accordingly, the invention is not to be limited except as by the appended claims.

We claim:

1. For use in a station that is connectable to more than one type of communication medium in a network that employs a Carrier Sense Multiple Access with Collision Detection (CSMA/CD) protocol, a common interface comprising:

a first interface circuit, for conditioning and interpreting signals for communication with a network communication medium of a first type in accordance with a first protocol;

a second interface circuit, for conditioning and interpreting signals for communication with a network communication medium of a second type in accordance with a second protocol;

a single connector providing direct connection to a communication medium of either the first type or the second type; and switching means for selecting one of the first and second interface circuits for connection to the single connector including means for automatically identifying the protocol used by the network to which the station is connected, the means for automatically identifying including means for alternating between enabling a first mode of operation of the station and enabling a second mode of operation of the station to determine whether the station operates properly in the first mode or the second mode;

wherein the single connector has multiple connector pins, at least some of which are shared by data or control signals coupled to the first and second interface circuits, and wherein shared pin assignments in the connector as selected to minimize any adverse affects of connecting to a network that is incompatible with the selected interface circuit and its related protocol.

2. A common interface as defined in claim 1, wherein:

the first and second interface circuits are integrated into a single circuit chip.

3. A common interface as defined in claim 1, wherein:

the first protocol is known as the 10BASE-T protocol for twisted-pair communication media.

4. A common interface as defined in claim 3, wherein:

the second protocol is known as the Attachment Unit Interface (AUI) protocol for other types of communication media.

5. A common interface as defined in claim 1, wherein:

the switching means includes a manually operable gang switch.

6. A common interface as defined in claim 1, wherein:

the switching means is electronically operable.

7. A common interface as defined in claim 6, wherein the means for alternating includes:

means for enabling a first mode of operation of the station;

means for determining whether the station operates properly in the first mode;

means for continuing operation in the first mode if proper operation in that mode is determined;

means for enabling a second mode of operation if proper operation in the first mode is not determined;

means for determining whether the station operates properly in the second mode; and means for continuing operation in the second mode if proper operation in that mode is determined, and returning control to the means for enabling the first mode of operation, if proper operation in the second mode is not determined.

8. A common interface as defined in claim 7, wherein:

the first mode of operation is in accordance with 10BASE-T standards using a twisted-pair communication medium; and the second mode of operation is in accordance with a standard attachment unit interface (AUI) for connection to a different medium type through an appropriate medium attachment unit (MAU).

9. A common interface as defined in claim 8, wherein:

the means for determining whether the station operates properly in the first mode includes means for transmitting link test pulses onto the network and waiting for an appropriate response.

10. A common interface as defined in claim 9, wherein:

the means for determining whether the station operates properly in the first mode further includes means for testing the presence of input data signals when the station is not actively transmitting, whereby the input data signals are indicative of network operation in the second mode.

11. A common interface as defined in claim 8, wherein:

means for determining whether the station operates properly in the second mode includes means for detecting the presence of a received data signal or a received collision signal while transmitting a packet of data from the station, whereby the absence of a data input signal or a collision signal indicates improper operation in the second mode.

* * * * *